UNITED STATES PATENT OFFICE.

PAUL R. WELCH, OF WESTFIELD, NEW YORK.

METHOD OF MANUFACTURING GRAPE-JUICE.

1,258,627.   Specification of Letters Patent.   Patented Mar. 5, 1918.

No Drawing.   Application filed August 4, 1917. Serial No. 184,470.   REISSUED

*To all whom it may concern:*

Be it known that I, PAUL R. WELCH, a citizen of the United States of America, and resident of Westfield, in the county of Chautauqua, in the State of New York, have invented new and novel Methods of Manufacturing Grape-Juice, of which the following is a full, clear, and exact description.

This invention relates to a new and novel method of manufacturing grape juice.

The primary object of the invention is to produce a simple and economical method of manufacturing grape juice, effecting a maximum saving of the residue for by-product use.

The present or usual method of grape juice manufacture comprises the crushing or stemming of the grapes in any suitable manner. The crushed grapes are usually heated to give color and body to the expressed juice.

Such heating is, however, sometimes omitted, particularly in treating grapes in the manufacture of white grape juice.

The crushed grapes, either heated or unheated, are then pressed in the usual hydraulic wine or cider press, whereby the juice is separated from the pomace. Under present conditions, this pomace contains the seeds and comprises approximately 50% of moisture and has usually been thrown away or, at most, used as a fertilizer.

The juice so expressed is then sterilized or preserved in any suitable manner and stored in containers, usually of glass.

After several months of storage, the excess argol (lees) or potassium bi-tartrate separates from the juice and precipitates partly in the form of crystals and partly in the form of a fine sand or mud.

This precipitate is a valuable by-product and can be sold for cream of tartar manufacture, etc., the grape juice being drawn or pumped off and bottled.

This process has many disadvantages over that which I am about to describe.

1. The necessity of using powerful and expensive equipment in the initial operation of expressing the juice from the grapes, as for instance presses of the hydraulic type.

2. The inability of recovering the maximum amount of argol, due to the loss of that portion of the same included in and remaining in the pomace cake.

3. The difficulty of completely separating argol in the form of fine sand or mud from the grape juice.

4. The practical impossibility of utilizing the usual hydraulic presses, except in connection with grapes retaining a substantial body, and, therefore, before the seeds are removed from the grapes.

5. The practical impossibility of separating the grape seeds from the pomace cake, whereby the former may be utilized to produce another valuable by-product, viz:—grape-seed oil and grape seed meal.

6. The fact that the pomace contains the seeds materially effects its availability for the manufacture of products I have in mind, viz:—grape jam and grape butter.

Other disadvantages may appear from the following description.

The novel process of this application eliminates the above disadvantages, and preferably consists of the following steps:

1st. The stemmed or unstemmed grapes, either heated or unheated, are fed into a continuous pulping machine by means of which the grape juice and grape pulp are separated from the seeds and the stems, (if unstemmed grapes are used.)

The stems contain a material and valuable amount of potash and may be readily separated from the seeds by any suitable method, as a fanning or blowing process, which also separates any skins that may be discharged with the seeds.

Portions of the grape skins remain with the seeds and another portion is separated with the pulp and juice, the relative distribution depending largely upon whether the grapes are heated or unheated.

If unheated, the skins largely remain with the seeds. If heated, a larger percentage of the grape skins is embodied with the pulp and juice.

2nd. The pulp and juice may then be sterilized or otherwise preserved and stored in containers which may be glass, stone jugs, barrels and the like.

I do not desire to limit myself to the sterilization or the preservation of the pulp and juice as essential to the invention, or as accomplished in any particular manner when effected in the preferable manner of carrying out the method herein, as such step may be omitted, the grape juice and pulp being stored as it comes from the pulping machine, or processed and separated immediately if desired.

3rd. The pulp and juice are allowed to stand for a period of several months, which period may be shortened by cold treatment, during which period the argol or bi-tartrate will form in definite crystals throughout the entire pulpy mass, such crystals, as shown in my experiments, being of material size and somewhat flaky form.

4th. These crystals including the argol heretofore lost in the pomace may be recovered in any suitable manner, as by a screening machine, such as a sugar type centrifugal equipped with proper size mesh screen, the pulp and juice being thrown out and the argol crystals retained within the screen.

5th. The grape juice and pulp may then be subjected to pressure in a filter press which will deliver the clear juice for bottling and discharge the pulp in a cake containing a minimum amount of moisture, the moisture content being less than that contained in the pomace cake produced in the present process.

This pulp or pomace cake contains a valuable quantity of protein, nitrogen-free extract, sugars, carbohydrates, etc., and may be dried and used as a stock food, or used in combination with entire grape pulp or other fruit juices or pulps in the manufacture of a fruit jam or a fruit butter.

The latter processes and products, as distinguished from the method of manufacturing grape juice, together with the process of producing grape-seed oil, may form the subject-matter of further applications to be filed.

Although I have described a process comprising a specific series of steps and definite methods of effecting each step, all as perhaps preferable in carrying out my invention, I do not desire to limit myself to the same, as many changes and substitutions may be made in each and all of the same without departing from the spirit of this invention as set forth in the appended claims.

What I claim is:

1. The method of manufacturing grape juice comprising separating the seeds from the pulp and juice, storing the pulp and juice until the argol crystallizes, separating the crystallized argol from the pulp and juice, and then separating the juice from the pulp.

2. The method of manufacturing grape juice consisting in heating the grapes, introducing the heated grapes into a pulping machine whereby the seeds are separated from the pulp and juice, storing the pulp and juice until the argol crystallizes, separating the crystallized argol from the pulp and juice, and then separating the juice from the pulp.

3. The method of manufacturing grape juice comprising separating the seeds from the pulp and juice, sterilizing the pulp and juice, storing the pulp and juice until the argol crystallizes, separating the crystallized argol from the pulp and juice, and then separating the juice from the pulp.

4. The method of manufacturing grape juice consisting in heating the grapes, introducing the heated grapes into a pulping machine whereby the seeds are separated from the pulp and juice, sterilizing the pulp and juice, storing the pulp and juice until the argol crystallizes, separating the crystallized argol from the pulp and juice, and then separating the juice from the pulp.

5. The method of manufacturing grape juice comprising separating the seeds from the pulp and juice, storing the pulp and juice until the argol crystallizes, centrifugally screening the crystallized argol from the pulp and juice, and then separating the juice from the pulp.

6. The method of manufacturing grape juice comprising separating the seeds from the pulp and juice, sterilizing the pulp and juice, storing the pulp and juice until the argol crystallizes, centrifugally screening the crystallized argol from the pulp and juice, and then separating the juice from the pulp.

7. The method of manufacturing grape juice comprising separating the stems and seeds from the pulp and the juice, storing the pulp and juice until the argol crystallizes, separating the crystallized argol from the pulp and juice, and then separating the juice from the pulp.

8. The method of manufacturing grape juice comprising segregating the pulp and juice, separating excess argol from the pulp and juice, and then separating the juice from the pulp.

9. The method of manufacturing grape juice comprising the formation of a composite body of grape material, the crystallization of the argol in definite crystals throughout said composite body, and the separation of the juice from the composite body.

10. The method of manufacturing grape juice comprising the formation of a composite body of grape material, the crystallization of the argol in definite crystals throughout said composite body, separating the crystallized argol from the composite body, and then separating the juice from the other grape material comprising the composite body.

11. The method of manufacturing grape juice comprising the formation of a composite body of grape material of consistency sufficient to effect the formation by crystallization of a substantially uniform distribution of definite argol crystals throughout the entire composite body, permitting the formation of such argol crystals, and separating the grape juice from the composite body and the crystallized argol.

12. The method of manufacturing grape juice comprising the formation of a composite body of grape material of consistency sufficient to effect the formation by crystallization of a substantially uniform distribution of definite argol crystals throughout the entire composite body, permitting the formation of such argol crystals, separating the crystallized argol from the composite body, and then separating the juice from the other grape material comprising the composite body.

In witness whereof I have hereunto set my hand this 12th day of July, 1917.

PAUL R. WELCH.

Witnesses:
 W. P. OAKES,
 IVAN DUDLEY.